US009519997B1

(12) United States Patent
Ryu (10) Patent No.: US 9,519,997 B1
(45) Date of Patent: Dec. 13, 2016

(54) PERFECT BOUNDING FOR OPTIMIZED EVALUATION OF PROCEDURALLY-GENERATED SCENE DATA

(75) Inventor: David Ryu, San Francisco, CA (US)

(73) Assignee: Pixar, Emeryville, CA (US)

( * ) Notice: Subject to any disclaimer, the term of this patent is extended or adjusted under 35 U.S.C. 154(b) by 1714 days.

(21) Appl. No.: 12/044,721

(22) Filed: Mar. 7, 2008

Related U.S. Application Data (60) Provisional application No. 60/894,042, filed on Mar. 9, 2007.

(51) Int. Cl.
```
G09G 5/00      (2006.01)
G06T 15/30     (2011.01)
G06T 15/00     (2011.01)
```

(52) U.S. Cl.
CPC .............. *G06T 15/30* (2013.01); *G06T 15/00* (2013.01)

(58) Field of Classification Search
USPC ................................................. 345/622, 473
See application file for complete search history.

(56) References Cited

U.S. PATENT DOCUMENTS

| | | | | |
|---|---|---|---|---|
| 5,432,894 A * | 7/1995 | Funaki | ........................ | 345/419 |
| 5,596,686 A * | 1/1997 | Duluk, Jr. | ..................... | 345/422 |
| 5,864,342 A * | 1/1999 | Kajiya et al. | ................ | 345/418 |
| 6,016,148 A * | 1/2000 | Kang et al. | .................... | 345/622 |
| 6,326,964 B1 * | 12/2001 | Snyder et al. | ................ | 345/419 |
| 6,570,564 B1 * | 5/2003 | Sowizral et al. | ............. | 345/420 |
| 7,009,608 B2 * | 3/2006 | Pharr et al. | .................... | 345/426 |
| 7,218,331 B2 * | 5/2007 | Huang et al. | ................. | 345/622 |
| 7,432,925 B2 * | 10/2008 | D'Amora | ....................... | 345/419 |
| 7,561,155 B1 * | 7/2009 | Gardiner et al. | ............. | 345/420 |
| 7,583,272 B2 * | 9/2009 | Ramani et al. | ............... | 345/621 |
| 7,737,966 B2 * | 6/2010 | Nishida et al. | ............... | 345/419 |
| 8,019,788 B1 * | 9/2011 | Carter et al. | .................... | 707/802 |
| 8,411,087 B2 * | 4/2013 | Wei et al. | ..................... | 345/426 |
| 2003/0038798 A1 * | 2/2003 | Besl et al. | .................... | 345/420 |
| 2003/0043171 A1 * | 3/2003 | Fliflet | ........................... | 345/622 |
| 2003/0065668 A1 * | 4/2003 | Sowizral et al. | ............. | 707/100 |
| 2003/0122850 A1 * | 7/2003 | Koneru et al. | ................. | 345/620 |
| 2003/0227457 A1 * | 12/2003 | Pharr et al. | .................... | 345/426 |
| 2004/0189645 A1 * | 9/2004 | Beda et al. | .................... | 345/473 |
| 2005/0140694 A1 * | 6/2005 | Subramanian et al. | ...... | 345/619 |
| 2005/0179686 A1 * | 8/2005 | Christensen et al. | ......... | 345/423 |

(Continued)

*Primary Examiner* — M Good Johnson
(74) *Attorney, Agent, or Firm* — Patterson + Sheridan LLP (57) ABSTRACT

Optimally-sized bounding boxes for scene data including procedurally generated geometry are determined by first determining whether an estimated bounding box including the procedural geometry is potentially visible in an image to be rendered. If so, the procedural geometry is generated and an optimal bounding box closely bounding the procedural geometry is determined. The generated procedural geometry may then be discarded or stored for later use. Rendering determines if the optimal bounding box is potentially visible. If so, then the associated procedural geometry is regenerated and rendered. Alternatively, after the estimated bounding box is potentially visible, the generated procedural geometry may be partitioned into subsets using a spatial partitioning scheme. A separate optimal bounding box is determined for each of the subsets. During rendering, if any of the optimal bounding boxes are potentially visible, the associated procedural geometry is regenerated and rendered.

27 Claims, 8 Drawing Sheets

(56) References Cited

U.S. PATENT DOCUMENTS

| | | | |
|---|---|---|---|
| 2005/0231508 A1* | 10/2005 | Christensen et al. | 345/428 |
| 2005/0243082 A1* | 11/2005 | Christensen et al. | 345/418 |
| 2005/0243085 A1* | 11/2005 | Schechter et al. | 345/419 |
| 2006/0274070 A1* | 12/2006 | Herman et al. | 345/474 |
| 2006/0274076 A1* | 12/2006 | Cook | 345/581 |
| 2006/0274085 A1* | 12/2006 | Cook | 345/620 |
| 2007/0216710 A1* | 9/2007 | Stevenson et al. | 345/622 |
| 2008/0036782 A1* | 2/2008 | Bruderlin et al. | 345/581 |
| 2008/0043022 A1* | 2/2008 | Ishihara | 345/428 |

\* cited by examiner

PERFECT BOUNDING FOR OPTIMIZED EVALUATION OF PROCEDURALLY-GENERATED SCENE DATA

CROSS-REFERENCE TO RELATED APPLICATIONS

This application claims priority to U.S. Provisional Patent Application No. 60/894,042, filed Mar. 9, 2007, which is incorporated by reference herein for all purposes.

BACKGROUND OF THE INVENTION

The present invention relates to the field of computer graphics, and in particular to methods and apparatus for optimizing the evaluation of functions associated with surfaces. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Procedurally-generated data is often used to provide fine details in computer graphics images and animation. For example, hair, fur, grass, trees, rocks, and other elements of a scene may be generated procedurally. Procedures, which include shading programs, referred to as shaders, script programs, stand-alone programs, and dynamically loaded programs, can generate large amounts of data from a relatively small amount of input data. Thus, a user can provide a small amount of input parameters to a procedure to add a large amount of detail to a scene, rather than adding this detail manually. Procedures can specify scene or object geometry, texture maps, lighting and shading properties, animation, or any other attribute of a scene. For example, a user can add millions of hairs to an animated character by specifying a few parameters of a hair generation procedure, rather than modeling and animating millions of hairs by hand Thus, creating large data sets procedurally is often more efficient and cost effective than having a modeler, artist, or animating manually create data.

Because procedures can add large amounts of detail to a scene, it is important to carefully control their application to prevent too much data from overwhelming the renderer. If there is too much detail in a scene, a renderer may take too much time and computational resources to generate images, or even worse, crash the rendering system.

Some renderers create images in small pieces, such as scanlines or "buckets" of adjacent pixels. For example, a scanline might include all of the pixels in a row of an image and a bucket might include a 16 by 16 group of pixels. Renderers can often process each scanline, bucket, or other piece of the image independently, allowing rendering to be highly parallelized. For each piece of an image, a renderer processes the scene data to determine which portions of the scene are potentially visible to that piece. The potentially visible portions of the scene for each image piece are then evaluated to determine the color, transparency, and/or other values for each pixel in the image piece.

One way to control the application of procedurally generated data is to specify a bounding box or other bounding region or volume. A bounding box defines a conservative estimate of the portion of the scene potentially including the procedurally generated data. A bounding box can be defined as a three-dimensional space within the scene or as a two-dimensional region within a corresponding image. During rendering, the renderer will determine whether a bounding box is visible to the current camera viewpoint and/or to the current scanline, bucket, or other piece of the image. If so, the bounding box will be "cracked open" and the procedure associated with the bounding box will be executed. This will generate the desired procedural data. The newly generated procedural data is added to the set of scene data to be processed by the renderer. The renderer will then process the procedurally generated data in the same or similar manner as the rest of the data in the scene. Conversely, if the bounding box is not visible from the current camera viewpoint and/or to the current scanline, bucket, or other piece of the image, the procedure will not be executed and its corresponding procedural data will not be added to the scene. This reduces the amount of data unnecessarily processed by the renderer, which decreases the time and computational resources required for rendering.

One problem with bounding boxes is specifying the optimal bounding box size. If the bounding box is too small, then the renderer will "miss" the bounding box and procedurally generated data that should be in the scene will be missing. Conversely, if the bounding box is too big, the performance benefits of using a bounding box are eliminated. For example, if the bounding box is too large, buckets or other pieces of the image will often intersect with or "see" the bounding box even when the geometry and other scene data contained within the bounding box is not visible to the bucket. As a result, the renderer will often waste computational resources generating and processing procedural data, only to determine that none of this procedural data is actually visible to the bucket.

Moreover, if procedurally generated data is applied to animated objects, the optimal size of the bounding box may change substantially as the object is manipulated into different positions. Furthermore, many procedures use random data or noise values to make the data appear natural rather than artificial. Because of this, it is difficult or impossible to predetermine and cache an optimal bounding box size for procedures.

It is therefore desirable for a system and method to provide optimally sized bounding boxes to optimize the evaluation of procedurally generated data during rendering. It is further desirable for the system and method efficient determine the optimal size of a bounding box with minimal additional processing overhead. It is also desirable for the system and method to be easily integrated with a wide variety of procedures and types of procedurally-generated data.

BRIEF SUMMARY OF THE INVENTION

An embodiment of the invention improves rendering efficiency by determining optimally-sized bounding boxes for scene data including procedurally generated geometry. Scene data including a specification of procedural geometry is initially associated with an estimated bounding box, which may be manually specified or automatically specified based on the input parameters and attributes of the procedural geometry. The estimated bounding box is a conservative estimate of the extent of the procedural geometry and any associated scene data.

An embodiment of the invention determines whether the estimated bounding box is potentially visible in an image to be rendered. If the estimated bounding box is potentially visible, an embodiment of the invention generates the procedural geometry, for example by executing the procedure and any specified input parameters. Using the procedural geometry, an embodiment of the invention determines an optimal bounding box. The optimal bounding box is typically sized to be equal to or slightly larger than the maximum dimensional extents of the procedural geometry. The optimal bounding box is then stored for later use.

Following the determination of the optimal bounding box, embodiments of the invention either discard the generated procedural geometry or store it for later use. During rendering of the image, an embodiment of the invention determines whether the optimal bounding box is potentially visible in the image to be rendered. If not, then no further evaluation of the procedural geometry is required. If the optimal bounding box is determined to be potentially visible, then an embodiment of the invention regenerates the associated procedural geometry, either by re-executing the procedure or by retrieving the cached procedural geometry. The generated procedural geometry is then rendered along with other scene data to create a rendered image.

In a further embodiment, if the estimated bounding box is determined to be potentially visible, the procedural geometry is generated and then partitioned into subsets using a spatial partitioning scheme, such as an octree or kd-tree. A separate optimal bounding box is determined for each of the subsets of procedural geometry. During rendering, this embodiment of the invention determines which of the optimal bounding boxes, if any, are potentially visible, and regenerates the procedural geometry only for the potentially visible optimal bounding boxes. The regenerated procedural geometry is then rendered along with other scene data to create a rendered image.

BRIEF DESCRIPTION OF THE DRAWINGS

The invention will be described with reference to the drawings, in which.

DETAILED DESCRIPTION OF THE INVENTION

Figure 1:
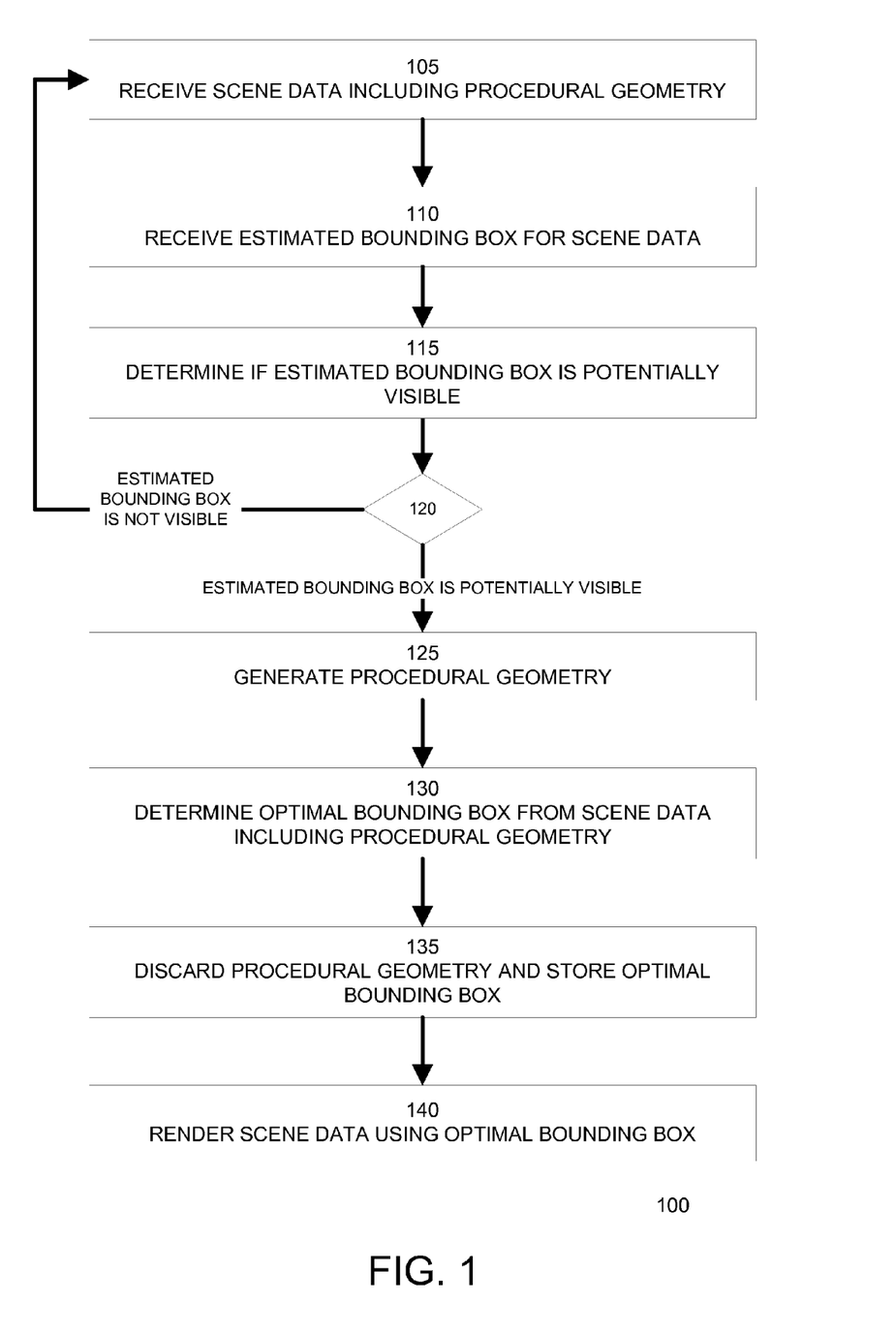
FIG. 1 illustrates a method of providing an optimally sized bounding box according to an embodiment of the invention.

FIG. 1 illustrates a method 100 of providing an optimally sized bounding box according to an embodiment of the invention. Step 105 receives scene data including procedurally-defined geometry. Scene data may specify the geometry; lighting and shading; camera viewpoints; positions, poses, and animation data; and any other data that may affect the appearance of one or more images rendered from the scene data. The procedural geometry may be specified by one or more procedures, which may be a compiled or interpreted program, procedure, function, shading program, formula, or other implementation of an algorithm, and input parameters. The procedures and/or input parameters may be included in the scene data or specified elsewhere. As used in this application, procedural geometry refers to any geometry or other scene data that provided to the renderer by a procedure. Examples of procedural geometry include geometry generated algorithmically from a set of input parameters and geometry previously created by users and/or procedures and retrieved from memory or data storage via a procedure.

Step 110 receives an estimated bounding box for the scene data including the procedural geometry. In an embodiment, the estimated bounding box is a conservative estimate of the location and maximum size of the scene data in world space, image space, projected on an image plane, or in any other coordinate reference. Although referred to as a bounding "box," the estimated or optimally determined location and maximum size of the scene data may be specified in terms of any arbitrary type of shape, including any type of two-dimensional polygon or three-dimensional polyhedron.

In an embodiment, the estimated bounding box is determined at least in part from the parameters or attributes of the procedural geometry. For example, the specification of the procedural geometry may include a size parameter or attribute indicating the maximum potential size of the procedural geometry to be created by a procedure. Using this information, an estimated bounding box may be manually or automatically determined that specifies a conservative estimate of the location and maximum size of the scene data including the procedural geometry.

Step 115 determines if the estimated bounding box is potentially visible from one or more camera viewpoints to be used in rendering one or more images. In an embodiment, step 115 determines if any portion of the estimated bounding box is inside of a viewing frustum associated with a camera viewpoint. If so, then the estimated bounding box is potentially visible from the camera viewpoint. In another embodiment, step 115 partitions an image into image pieces and determines if the projection of the estimated bounding box on to the image plane is at least partially within an image piece. It should be noted that the term "potentially visible" is used because even if a portion of the estimated bounding box is within the field of view or viewing frustum of a camera viewpoint, the scene data enclosed by the estimated bounding box may be outside the field of view or occluded by other objects in a scene. Other embodiments of step 115 may use any other type of visibility tests known in the art to determine if the estimated bounding box is potentially visible.

Decision block 120 evaluates the result of step 115. If the estimated bounding box is potentially visible, then method 100 proceeds to step 125. Otherwise, method 100 ends or optionally returns to step 105 to evaluate a different set of scene data and procedural geometry.

Step 125 generates the procedural geometry associated with the estimated bounding box. In an embodiment, step 125 executes the procedure and optionally any input parameters specified by the scene data in step 105. As discussed above, the procedure used to generate procedural geometry may include one or more compiled or interpreted programs, procedures, functions, shading programs, formulas, or other implementations of an algorithm. Additionally, embodiments of step 125 may execute the procedure as native code on a general purpose processor, within a virtual machine, and/or using specialized processing hardware, such as a graphics processing unit. The result of step 125 is a set of procedurally-generated geometry. The procedural geometry may be specified using any type of geometric representation known in the art, including particle systems or point sets; lines or curves; polygons; higher-order curved surfaces; subdivision surfaces; and volumetric representations, such as voxels or solid geometry.

The procedure may also generate shading attributes, such as color, transparency, and other optical properties of the procedural geometry. In an embodiment, step 125 may direct the procedure to skip the generation of shading attributes of the procedural geometry.

Step 130 determines an optimal bounding box from the scene data including the generated procedural geometry. In an embodiment, the optimal bounding box is the minimum size bounding box (or any other bounding entity) that completely covers the scene data and the procedural geometry. Typically, the optimal bounding box is smaller than the estimated bounding box, or in the worst case, the same size as the estimate bounding box. In an embodiment, an optimally-sized bounding box is initially set to a size of zero. Each element of procedurally generated geometry (and any other scene data) is evaluated to determine whether it is enclosed by the optimal bounding box. If not, the dimensions of the bounding box are resized so that the extents of the optimal bounding box are equal to or greater than the dimensions of this element of procedural geometry or scene data. This evaluation is then repeated for any remaining elements of procedural geometry and scene data.

Step 135 discards the generated procedural geometry and stores the optimal bounding box for the scene data. In an alternate embodiment, the generated procedural geometry may also be stored for later use.

Step 140 renders the scene data using the optimal bounding box. In an embodiment, step 140 determines if the optimal bounding box is potentially visible to one or more camera viewpoints in a manner similar to step 115. If the optimal bounding box is not potentially visible, then the associated scene data including procedural geometry is not rendered. If the optimal bounding box is potentially visible, then an embodiment of step 140 regenerates the procedural geometry associated with this scene data. In an embodiment, step 140 re-executes the procedures associated with the scene data to regenerate the procedural geometry In a further embodiment, step 140 also directs the procedure to generate the shading attributes of the procedural geometry. In an alternate embodiment, step 140 retrieves the procedural geometry optionally stored in step 135 from data storage. Generally, the former embodiment is useful when executing procedures is less computationally expensive than retrieving data from storage, while the latter embodiment is useful in the converse situation. Regardless of whether procedural geometry is regenerated or retrieved from data storage, a renderer processes this procedural geometry and scene data similarly to other geometry to generate one or more final rendered images potentially including the procedural geometry. Step 140 may use any rendering technique known in the art including ray tracing, scanline rendering, rasterization, micropolygon rendering, and volume rendering.

In an embodiment, a procedure can be modified to accept an additional calling parameter or flag value that specifies whether the procedure should generate an optimally-sized bounding box and optionally discard its data or output procedurally generated data to the renderer for processing. In other embodiment, wrapper functions or other programming techniques known in the art can be used to encapsulate procedures to provide this functionality.

In a further embodiment, the procedure is further optimized to reduce the computation time and resources required to determine the optimal bounding box size. For example, the data generated by the procedure can be split into two portions: a reference data portion that does not vary with time or the pose of any associated objects and an animated data portion that changes over time and/or the posing of any underlying objects.

In this embodiment, the reference data portion can be generated once and cached for use in any frame of animation that includes the associated procedure. The animated data portion can be derived from the input parameters of the procedure and optionally the cached reference data portion. In many cases, the derivation of the animated data portion from input parameters of the procedure and/or the reference data portion is more efficient than computing the entire set of procedurally generated data from scratch for each frame or image.

Figure 2A:
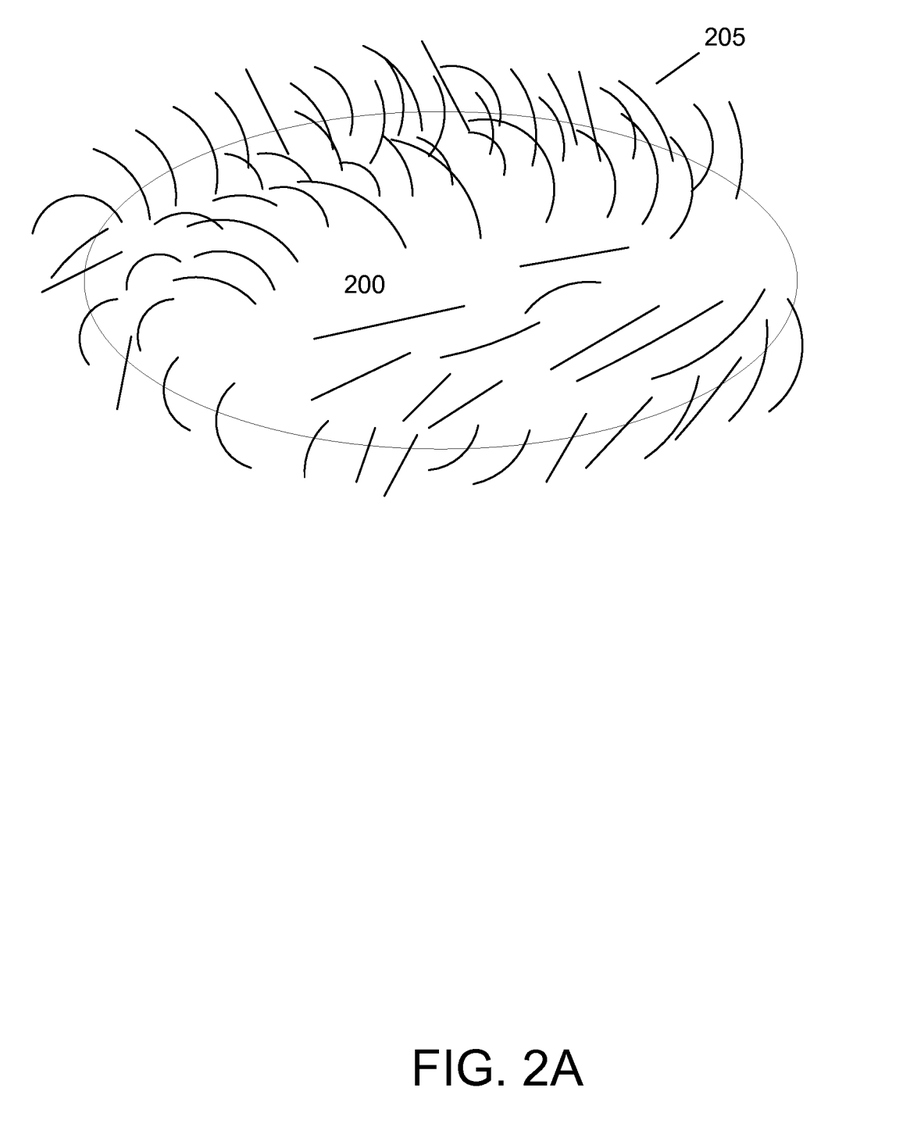
FIGS. 2A-2D illustrate examples of the problems associated with bounding boxes and how embodiments of the invention address these problems.

FIGS. 2A-2D illustrate examples of the problems associated with bounding boxes and how embodiments of the invention address these problems. FIG. 2A illustrates an example object 200 associated with procedurally generated geometry. Example object 200 is covered with hairs 205, which are generated procedurally.

Figure 2B:
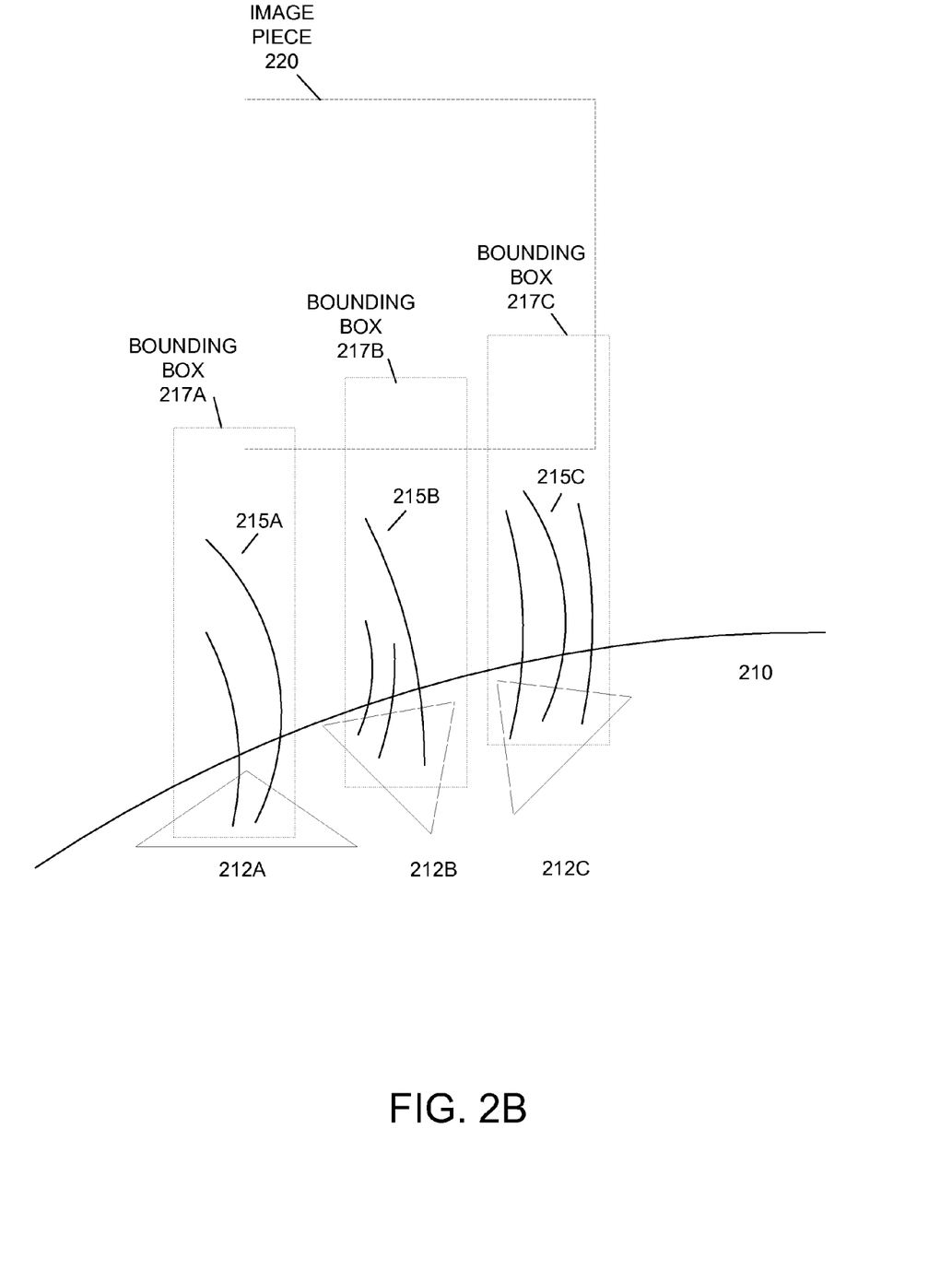

FIG. 2B illustrates the problem of bounding boxes that are too large. FIG. 2B illustrates a portion 210 of object 200. Portion 210 of object 200 can be specified as a set of faces 212, including faces 212a, 212b, and 212c. In this example, a procedure can be associated with each of the faces 212 to generate the corresponding hair sets 215a, 215b, and 215c. For the hair sets 215A, 215B, and 215C, corresponding bounding boxes 217A, 217B, and 217C are provided.

As shown in FIG. 2B, the bounding boxes 217A, 217B, and 217C are substantially larger than the procedurally generated geometry contained within the bounding boxes. This can lead to unnecessary waste of computational resources during rendering. For example, when a renderer evaluates an image piece 220, the renderer will determine that bounding boxes 217A, 217B, and 217C are all potentially visible to image piece 220, because the projection of these bounding boxes 217A-217C on to the image plane intersect with the image piece 220. As a result, the renderer will execute the procedures associated with the bounding boxes 217A-217C to generate the data specifying the geometry and other attributes of the hair sets 215A, 215B, and 215C.

However, as can be seen in FIG. 2B, none of the generated hair sets 215A, 215B, and 215C intersect image piece 220. Therefore, the renderer will discard this procedural data after evaluation. Because of the relatively large size of the bounding boxes 217 as compared with their enclosed geometry, there will be many similar instances where procedural geometry is created and then completely discarded, wasting substantial computational resources.

Figure 2C:
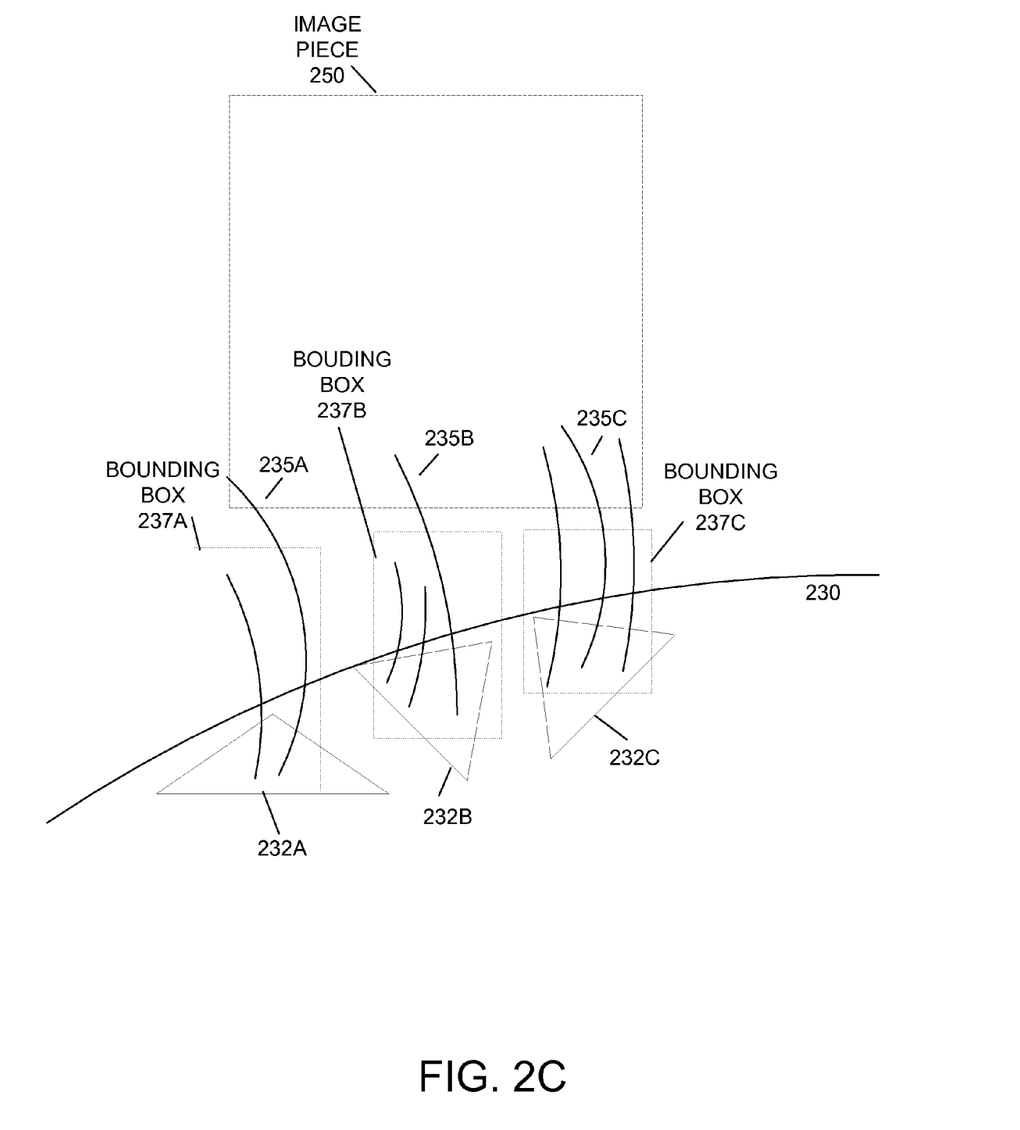

FIG. 2C illustrates the problem of bounding boxes that are too small. FIG. 2C illustrates a portion 230 of object 200. Portion 230 of object 200 can be specified as a set of faces 232, including faces 232a, 232b, and 232c. In this example, a procedure can be associated with each of the faces 232 to generate the corresponding hair sets 235a, 235b, and 235c. For the hair sets 235A, 235B, and 235C, corresponding bounding boxes 237A, 237B, and 237C are provided.

As shown in FIG. 2C, the bounding boxes 237A, 237B, and 237C are substantially smaller than the procedurally generated geometry contained within the bounding boxes. As result, some of the procedurally generated hair sets 235 lie outside of their corresponding bounding boxes. This can lead to visual errors during rendering. For example, when a renderer evaluates an image piece 250, the renderer will determine that bounding boxes 237A, 237B, and 237C are not visible to image piece 250, because the projection of these bounding boxes 237A-237C on to the image plane do not intersect with the image piece 250. As a result, the renderer will not execute the procedures associated with the bounding boxes 237A-237C to generate the data specifying the geometry and other attributes of the hair sets 235A, 235B, and 235C. Thus, the hair sets 235A, 235B, and 235C will be erroneously omitted from image piece 250 in the rendered image.

Figure 2D:
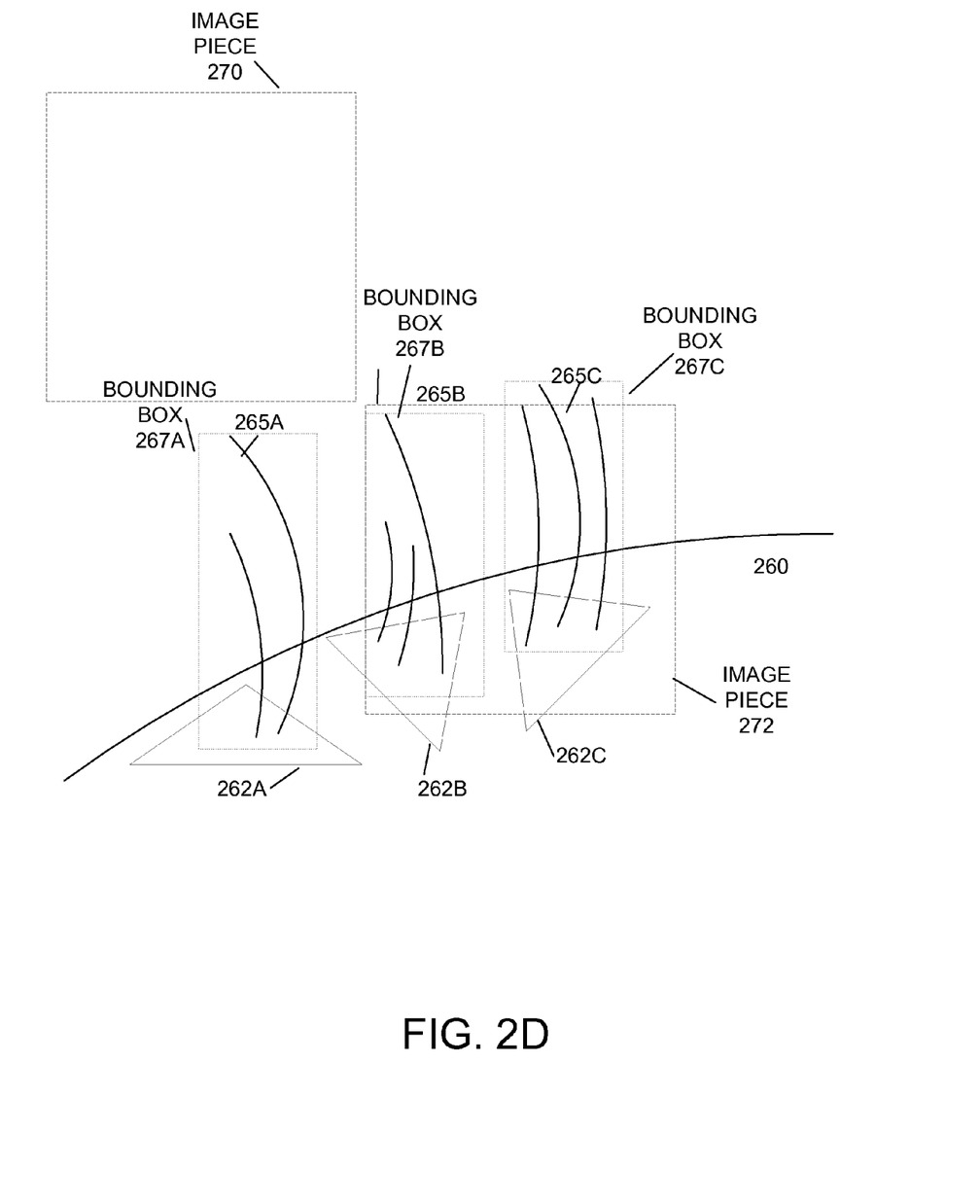

FIG. 2D illustrates the application of optimally sized bounding boxes created according to an embodiment of the invention. FIG. 2D illustrates a portion 260 of object 200. Portion 260 of object 200 can be specified as a set of faces 262, including faces 262A, 262B, and 262C. In this example, a procedure can be associated with each of the faces 212 to generate the corresponding hair sets 265A, 265B, and 265C. For the hair sets 265A, 265B, and 265C, corresponding bounding boxes 267A, 267B, and 267C are provided.

The bounding boxes 267A, 267B, and 267C are optimally-sized to completely enclose the procedurally generated geometry without including unnecessary empty space. As a result, renderer efficiency is greatly improved because procedural geometry is created and evaluated for an image piece only when there is a substantial likelihood that the geometry will be potentially visible in that image piece. However, despite the small size of the bounding boxes, each of the bounding boxes 267 fully encloses its associated procedural data. Thus, there will never be any visual artifacts or error resulting from bounding boxes that are too small.

For example, although image piece 270 is very close to the hair sets 265A, 265B, and 265C, this image piece 270 does not intersect the projection of any of the bounding boxes 267A, 267B, and 267C. Therefore, hair sets 265A, 265B, and 265C do not need to be created or evaluated for image piece 270. Similarly, image piece 272 does intersect the projection of bounding boxes 267B and 267C, so the hair sets 265B and 265C will be generated and/or evaluated by the renderer for image piece 272.

Figure 3:
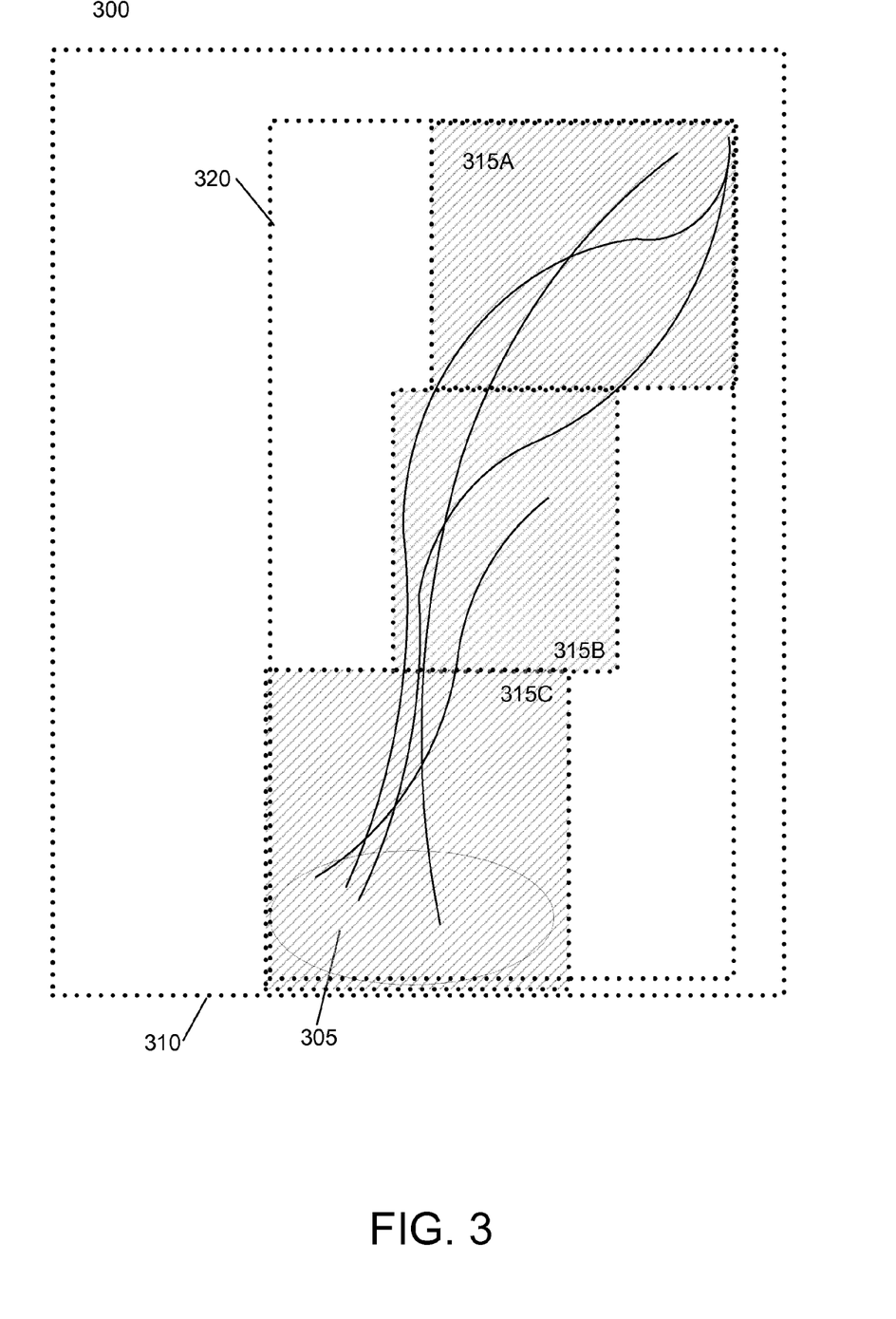
FIG. 3 illustrates an example of adaptively subdivided bounding boxes according to an embodiment of the invention.

In further embodiments, bounding boxes can be adaptively subdivided and tested for potential visibility against an image piece prior to generating procedural data. FIG. 3 illustrates an example 300 of this embodiment. An object 305 and its procedural geometry are initially enclosed completely by an estimated bounding box 310. When the estimated bounding box is determined to be potentially visible in an image, an embodiment of the invention generates the procedural geometry within the estimated bounding box. Next, this embodiment of the invention partitions the procedural geometry into two or more subsets and determines an optimal bounding box for each subset. Embodiments of the invention may use any spatial partitioning technique known in the art, such as octrees or kd-trees, to partition the procedural geometry into multiple subsets. In example 300, the procedural geometry generated within estimated bounding box 310 is subdivided into three subsets. Optimal bounding boxes 315A-315C are determined for these subsets.

Each optimal bounding box associated with one of the subsets of procedural geometry is tested for potential visibility and optimal bounding boxes that are not visible are removed from further consideration. As can be seen in example 300, the total area occupied by optimal bounding boxes 315A-315C is much less than the area of estimated bounding box 310. Additionally, the total area occupied by optimal bounding boxes 315A-315C is less than the area occupied by a single optimal bounding box 320 including all of the procedural geometry. Optimal bounding boxes 315A-315C are a closer fit to the procedural geometry than the single optimal bounding box 320, resulting in more efficient rendering.

In a further embodiment, an element of procedural geometry may be split along one or more predefined splitting locations into two or more sub-elements. Each sub-element is then assigned to an optimal bounding box based on its location or other criteria. For example, if the procedural geometry includes long hairs associated with a region of a surface, an embodiment of the invention may split each hair into thirds, forming three sub-elements for each hair A first optimal bounding box may be defined to enclose all of the first third sub-elements. Similarly, a second optimal bounding box may be defined to enclose all of the second third sub-elements, and a third optimal bounding box may be defined to enclose all of the second third sub-elements.

Figure 4:
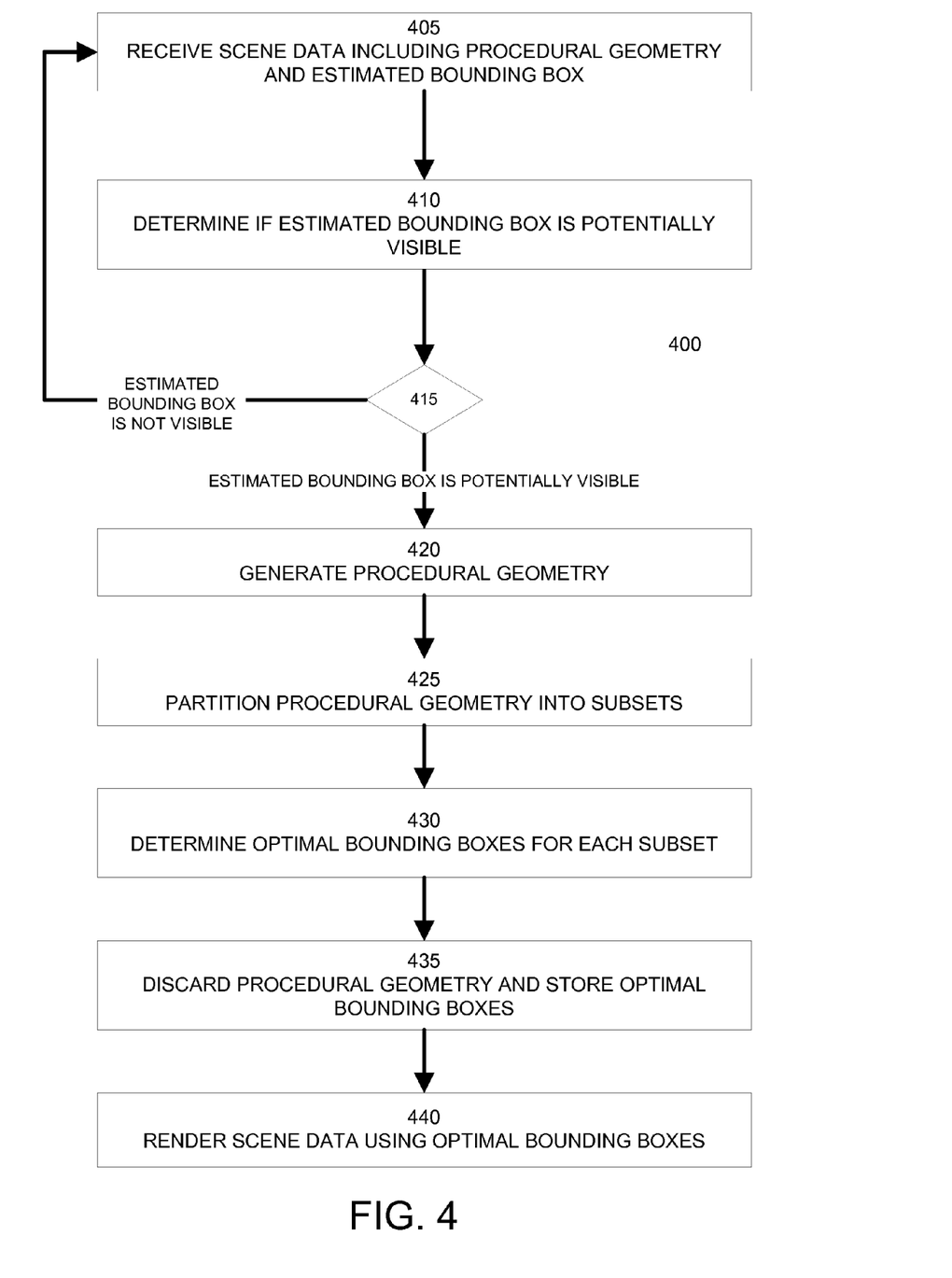
FIG. 4 illustrates a method of providing and using adaptively subdivided bounding boxes of optimal size according to an embodiment of the invention.

FIG. 4 illustrates a method 400 of providing and using adaptively subdivided bounding boxes of optimal size according to an embodiment of the invention. Step 405 receives scene data including procedurally-defined geometry and an estimated bounding box for this scene data, similar to steps 105 and 110 discussed above. In step 405, the scene data may specify the geometry; lighting and shading; camera viewpoints; positions, poses, and animation data; and any other data that may affect the appearance of one or more images rendered from the scene data. The procedural geometry may be specified by one or more procedures, which may be a compiled or interpreted program, procedure, function, shading program, formula, or other implementation of an algorithm, and input parameters. The procedures and/or input parameters may be included in the scene data or specified elsewhere.

Additionally, the estimated bounding box received by step 405 is a conservative estimate of the location and maximum size of the scene data in world space, image space, projected on an image plane, or in any other coordinate reference. Although referred to as a bounding "box," the estimated or optimally determined location and maximum size of the scene data may be specified in terms of any arbitrary type of shape, including any type of two-dimensional polygon or three-dimensional polyhedron. In an embodiment, the estimated bounding box is determined at least in part from the parameters or attributes of the procedural geometry. Using this information, an estimated bounding box may be manually or automatically determined that specifies a conservative estimate of the location and maximum size of the scene data including the procedural geometry.

Step 410 determines if the estimated bounding box is potentially visible from one or more camera viewpoints to be used in rendering one or more images. In an embodiment, step 410 determines if any portion of the estimated bounding box is inside of a viewing frustum associated with a camera viewpoint. If so, then the estimated bounding box is potentially visible from the camera viewpoint. Other embodiments of step 410 may use any other type of visibility tests known in the art to determine if the estimated bounding box is potentially visible.

Decision block 415 evaluates the result of step 410. If the estimated bounding box is potentially visible, then method 400 proceeds to step 420. Otherwise, method 400 ends or optionally returns to step 405 to evaluate a different set of scene data and procedural geometry.

Step 420 generates the procedural geometry associated with the estimated bounding box. In an embodiment, step 420 executes the procedure and optionally any input parameters specified by the scene data in step 405. The result of step 420 is a set of procedurally-generated geometry. The procedural geometry may be specified using any type of geometric representation known in the art, including particle systems or point sets; lines or curves; polygons; higher-order curved surfaces; and volumetric representations, such as voxels or solid geometry.

Step 425 partitions the procedural geometry and optionally other geometry included in the scene data into two or more subsets. In an embodiment, step 425 partitions the procedural geometry according to its location. Embodiments of step 425 may use any area or spatial partitioning scheme known in the art, including octrees or quadtrees, Kd-trees, voxels, and brickmaps.

Step 430 determines an optimal bounding box for each subset. In an embodiment, the optimal bounding box of a subset is the minimum size bounding box (or any other bounding entity) that completely covers the procedural geometry and optionally scene data included in the subset. Typically, the optimal bounding box of a subset is smaller than the bounds of the subset, or in the worst case, the same size as the bounds of the subset.

Step 435 discards the generated procedural geometry and stores the optimal bounding boxes for the subsets. In an alternate embodiment, the generated procedural geometry associated with each subset and optimal bounding box may also be stored for later use.

Step 440 renders the scene data using the optimal bounding boxes. In an embodiment, step 440 determines if any of the optimal bounding boxes of the subsets are potentially visible to one or more camera viewpoints. The visibility test for each subset's optimal bounding box may be similar to the visibility test performed on the estimated bounding box. If one or more of the optimal bounding boxes is not potentially visible, then the associated subsets of procedural geometry are not rendered and no further evaluation of these subset of the procedural geometry are required.

Conversely, for each of the potentially visible bounding boxes, if any, an embodiment of step 440 regenerates the procedural geometry for the associated subset. In an embodiment, step 440 executes a version of the procedure that is adapted to generate procedural geometry only within the associated subset's bounding box. For example, the version of the procedure executed by step 440 may be controlled by an input parameter that specifies the location and/or dimensions of the optimal bounding box associated with the subset. In another example, the version of the procedure executed by step 440 may generate procedural geometry throughout the region of the estimated bounding box and then clip or remove geometry that is outside of the optimal bounding box of the associated subset. In another example, the version of the procedure executed by step 440 may be specifically designed to only generate procedural geometry within the region of the optimal bounding box for an associated subset. In this example, each subset and optimal bounding box may be associated with a different version of the procedure.

In an alternate embodiment, step 440 retrieves the procedural geometry associated with a potentially visible optimal bounding box stored in step 435 from data storage. Generally, the former embodiment is useful when executing procedures is less computationally expensive than retrieving data from storage, while the latter embodiment is useful in the converse situation. Regardless of whether procedural geometry is regenerated or retrieved from data storage, a renderer processes this procedural geometry and scene data similarly to other geometry to generate one or more final rendered images potentially including the procedural geometry. Step 440 may use any rendering technique known in the art including ray tracing, scanline rendering, rasterization, micropolygon rendering, and volume rendering.

Similar to method 100 discussed above, embodiments of method 400 can include procedures adapted to accept an additional calling parameter or flag value that specifies whether the procedure should generate an optimally-sized bounding box and optionally discard its procedural geometry, generate a subset of the procedural geometry associated with a specific optimal bounding box or the entire set of procedural geometry associated with the scene data, and/or output procedural geometry to the renderer for processing. In other embodiment, wrapper functions or other programming techniques known in the art can be used to encapsulate procedures to provide this functionality.

In a further embodiment, procedures may be further optimized to reduce the computation time and resources required to determine the optimal bounding box size. For example, the data generated by the procedure can be split into two portions: a reference data portion that does not vary with time or the pose of any associated objects and an animated data portion that changes over time and/or the posing of any underlying objects.

In this embodiment, the reference data portion can be generated once and cached for use in any frame of animation that includes the associated procedure. The animated data portion can be derived from the input parameters of the procedure and optionally the cached reference data portion. In many cases, the derivation of the animated data portion from input parameters of the procedure and/or the reference data portion is more efficient than computing the entire set of procedurally generated data from scratch for each frame or image.

Figure 5:
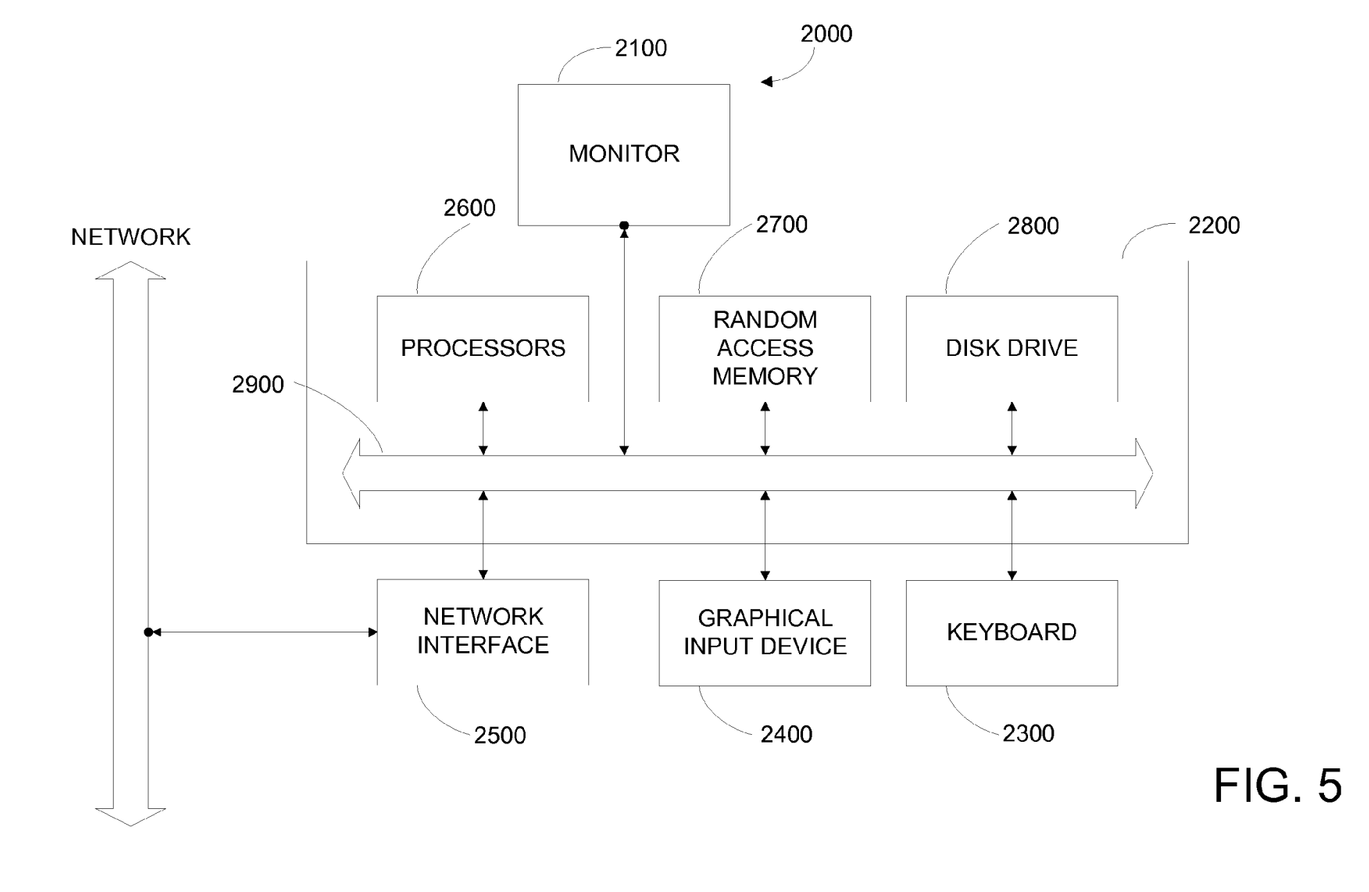
FIG. 5 illustrates a computer system suitable for implementing an embodiment of the invention.

FIG. 5 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of rendering a computer generated image including procedurally generated geometry, the method comprising:
    receiving scene data including a procedure adapted to generate scene geometry upon execution;
    in response to determining that a first bounding box encompassing a maximum potential size and associated with the procedure is potentially visible in an image to be rendered from the scene data:
        executing the procedure to generate a first instance of the scene geometry;
        defining a second bounding box encompassing the first instance of the scene geometry, wherein the second bounding box is smaller than the first bounding box; and
    in response to determining that the second bounding box associated with the procedure is potentially visible in the image, rendering the image from scene data including the scene geometry associated with the procedure.

2. The method of claim 1, wherein the second bounding box includes at least one boundary undefined until after the procedure is executed to generate the first instance of the scene geometry.

3. The method of claim 1, wherein the first bounding box is an estimated bounding box.

4. The method of claim 3, wherein determining if the first bounding box associated with the procedure is potentially visible comprises defining the first bounding box based at least in part from parameters or attributes associated with the procedure.

5. The method of claim 3, comprising storing the estimated bounding box with an association to the procedure.

6. The method of claim 1, wherein determining if the first bounding box associated with the procedure is potentially visible comprises:
    executing the procedure to generate a second instance of the scene geometry; and
    defining the first bounding box from the second instance of the scene geometry.

7. The method of claim 1, wherein the second bounding box includes a plurality of geometric primitives.

8. The method of claim 1, wherein determining if the first bounding box is potentially visible in the image to be rendered from the scene data includes determining if any portion of the first bounding box is inside a viewing frustum associated with a camera viewpoint.

9. The method of claim 1, wherein determining if the first bounding box is potentially visible in the image to be rendered from the scene data includes determining if at least a portion of a projection of the first bounding box into an image plane is inside the image.

10. The method of claim 1, wherein:
    defining a second bounding box from the first instance of the scene geometry comprises discarding the first instance of the scene geometry following the definition of the second bounding box; and
    rendering the image from scene data including the scene geometry associated with the procedure comprises executing the procedure to generate a second instance of the scene geometry.

11. The method of claim 1, wherein executing the procedure to generate the first instance of the scene geometry comprises:
    retrieving stored reference data previously generated by a reference portion of the procedure that is independent of time and pose;
    executing an animated portion of the procedure dependent upon at least time or pose to generate animated data; and
    combining the reference data and the animated data to create the first instance of the scene geometry.

12. The method of claim 1, wherein the scene geometry is selected from a group consisting of particles; point sets; lines; curves; polygons; higher-order curved surfaces; sub-division surfaces; voxels; and solid geometry.

13. The method of claim 1, wherein the first bounding box does not include any scene geometry associated with the procedure at the time of the determination that the first bounding box is at least potentially visible.

14. A method of rendering a computer generated image including procedurally generated geometry, the method comprising:
    receiving scene data including a procedure adapted to generate scene geometry upon execution;
    in response to determining that a first bounding box encompassing a maximum potential size and associated with the procedure is potentially visible in an image to be rendered from the scene data:
        executing the procedure to generate a first instance of the scene geometry;
        partitioning the first instance of the scene geometry into at least first and second subsets of scene geometry;
        defining a second bounding box encompassing the first subset of the scene geometry;
        defining a third bounding box encompassing the second subset of the scene geometry;
        in response to determining that the second bounding box is potentially visible in the image, including the first subset of the scene geometry in scene data;
        in response to determining that the third bounding box is potentially visible in the image, including the second subset of the scene geometry in scene data; and
        rendering the image from the scene data.

15. The method of claim 14, wherein partitioning the first instance of the scene geometry comprises splitting at least one element of the first instance of the scene geometry into at least two sub-elements along a predefined splitting location.

16. The method of claim 14, wherein partitioning the first instance of the scene geometry comprises assigning each element of the first instance of the scene geometry to one of the subsets based on its location according to a spatial partitioning scheme.

17. The method of claim 16, wherein the spatial partitioning scheme is selected from a group consisting of octrees; kd-trees; voxels; and brickmaps.

18. The method of claim 14, wherein the second bounding box includes at least one boundary undefined until after the procedure is executed to generate the first instance of the scene geometry.

19. The method of claim 14, wherein the first bounding box is an estimated bounding box defined at least in part from parameters or attributes associated with the procedure.

20. The method of claim 14, wherein determining if the first bounding box associated with the procedure is potentially visible comprises:
   executing the procedure to generate a second instance of the scene geometry; and
   defining the first bounding box from the second instance of the scene geometry.

21. The method of claim 14, wherein the second bounding box includes a plurality of geometric primitives.

22. The method of claim 14, wherein determining if the first bounding box is potentially visible in the image to be rendered from the scene data includes determining if any portion of the first bounding box is inside a viewing frustum associated with a camera viewpoint.

23. The method of claim 14, wherein determining if the first bounding box is potentially visible in the image to be rendered from the scene data includes determining if at least a portion of a projection of the first bounding box into an image plane is inside the image.

24. The method of claim 14, wherein:
   defining a second bounding box from the first instance of the scene geometry comprises discarding the first subset of the first instance of the scene geometry following the definition of the second bounding box; and
   rendering the image from scene data including the scene geometry associated with the procedure comprises executing the procedure to generate a second instance of a least a portion of the scene geometry.

25. The method of claim 14, wherein executing the procedure to generate the first instance of the scene geometry comprises:
   retrieving stored reference data previously generated by a reference portion of the procedure that is independent of time and pose;
   executing an animated portion of the procedure dependent upon at least time or pose to generate animated data; and
   combining the reference data and the animated data to create the first instance of the scene geometry.

26. The method of claim 14, wherein the scene geometry is selected from a group consisting of particles; point sets; lines; curves; polygons; higher-order curved surfaces; subdivision surfaces; voxels; and solid geometry.

27. The method of claim 14, wherein the first bounding box does not include any scene geometry associated with the procedure at the time of the determination that the first bounding box is at least potentially visible.

* * * * *